(12) United States Patent
Govindarajeswaran et al.

(10) Patent No.: US 9,323,984 B2
(45) Date of Patent: Apr. 26, 2016

(54) SYSTEM AND METHODS OF ADAPTIVE SAMPLING FOR EMOTIONAL STATE DETERMINATION

(71) Applicant: Wipro Limited, Bangalore (IN)

(72) Inventors: Maheshwaran Govindarajeswaran, Chennai (IN); Arun Jeyaprasad Arjun Jeyarani, Chennai (IN); Sudipta Ghosh, Kolkata (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/458,468

(22) Filed: Aug. 13, 2014

(65) Prior Publication Data

US 2015/0356349 A1    Dec. 10, 2015

(30) Foreign Application Priority Data

Jun. 6, 2014  (IN) .......................... 2796/CHE/2014

(51) Int. Cl.
    *G06K 9/00*    (2006.01)
(52) U.S. Cl.
    CPC ........ *G06K 9/00308* (2013.01); *G06K 9/00241* (2013.01)
(58) Field of Classification Search
    USPC ................................................ 382/115–127
    See application file for complete search history.

(56) References Cited

U.S. PATENT DOCUMENTS

| | | | | |
|---|---|---|---|---|
| 4,991,093 A * | 2/1991 | Roberge | ............... | G01N 23/046 382/131 |
| 5,469,512 A * | 11/1995 | Fujita | ................... | G06K 9/4604 382/118 |
| 5,978,522 A * | 11/1999 | Ishii | ...................... | G06T 3/4084 358/452 |
| 6,175,652 B1 * | 1/2001 | Jacobson | ................ | C30B 15/26 117/14 |
| 6,388,706 B1 * | 5/2002 | Takizawa | .............. | G06T 3/4015 348/272 |
| 6,455,840 B1 * | 9/2002 | Oliver | .................... | H04N 1/047 250/222.1 |
| 6,738,533 B1 * | 5/2004 | Shum | .................... | G06T 15/205 382/299 |
| 7,106,478 B2 * | 9/2006 | Takano | ..................... | G06T 5/20 358/1.9 |
| 7,602,417 B2 * | 10/2009 | Ogasawara | ........ | G06K 9/00228 348/152 |
| 7,941,002 B2 * | 5/2011 | Samadani | ............. | G06T 3/0012 348/240.2 |
| 8,768,313 B2 * | 7/2014 | Rodriguez | ......... | G06K 9/00986 382/118 |
| 2003/0108224 A1 * | 6/2003 | Ike | ..................... | G06K 9/00604 382/117 |
| 2004/0101212 A1 * | 5/2004 | Fedorovskaya | ... | G06F 17/30265 382/305 |

(Continued)

*Primary Examiner* — Alex Liew
(74) *Attorney, Agent, or Firm* — LeClairRyan, a Professional Corporation

(57) ABSTRACT

Systems, methods, and non-transitory computer readable media for determining the emotional state of a user are described herein. In one example, the method for determining the emotional state of the user comprises receiving a feed from a sensor at a default sampling frequency, and analyzing the feed to determine facial features of a user. The method further comprises computing an emotional quotient of the user based on the facial features, determining a trigger to re-compute the sampling frequency the feed, based in part on the emotional quotient and computing a new sampling frequency based in part on the trigger. Thereafter, the method comprises generating instructions for the sensor to capture the feed at the new sampling frequency.

18 Claims, 3 Drawing Sheets

(56) References Cited

U.S. PATENT DOCUMENTS

| | | | |
|---|---|---|---|
| 2005/0063568 A1* | 3/2005 | Sun | G06K 9/00234 382/117 |
| 2005/0074152 A1* | 4/2005 | Lewin | G01R 33/561 382/128 |
| 2006/0120570 A1* | 6/2006 | Azuma | G06K 9/00597 382/117 |
| 2006/0269155 A1* | 11/2006 | Tener | G06T 3/4038 382/243 |
| 2007/0002021 A1* | 1/2007 | Lin | G06F 3/0317 345/166 |
| 2007/0098303 A1* | 5/2007 | Gallagher | G06F 17/30247 382/305 |
| 2007/0122006 A1* | 5/2007 | Taniguchi | G06K 9/00295 382/116 |
| 2008/0260212 A1* | 10/2008 | Moskal | A61B 5/1079 382/118 |
| 2010/0008575 A1* | 1/2010 | Ouyang | H03M 1/127 382/168 |
| 2014/0369553 A1* | 12/2014 | Tsou | G06K 9/00845 382/103 |
| 2015/0139515 A1* | 5/2015 | Smith | A61B 6/032 382/131 |
| 2015/0213331 A1* | 7/2015 | Peng | G06K 9/6277 382/165 |

\* cited by examiner

SYSTEM AND METHODS OF ADAPTIVE SAMPLING FOR EMOTIONAL STATE DETERMINATION

This application claims the benefit of Indian Patent Application No. 2796/CHE/2014 filed Jun. 6, 2014, which is hereby incorporated by reference in its entirety.

TECHNICAL FIELD

The present subject matter is related, in general to the field of automated emotional recognition and, in particular, but not exclusively to a method and system of adaptive sampling for determining the emotional state of a user.

BACKGROUND

Generally, emotions of an individual or a user find manifestations through facial expressions of the user. The facial expressions of the user are generated by contractions of facial muscles, which results in temporally deformed facial features such as eye lids, eye brows, nose, lips and skin texture, often revealed by wrinkles and bulges. For most users, the changes in the facial features are brief, lasting for a few seconds, but rarely more than five seconds or less than 250 milliseconds (ms). The duration for which the changes in the facial features last is a very individualistic parameter and varies widely from user to user. This makes ascertaining the emotions of the user through facial features a challenging task.

SUMMARY

Disclosed herein are systems and methods of adaptive sampling for determining the emotional state of a user. In one example, the system of adaptive sampling for determining the emotional state of a user comprises a processor, a memory communicatively coupled to the processor, wherein the memory stores processor-executable instructions, which, on execution, cause the processor to receive a feed from a sensor at a default sampling frequency, and analyze the feed to determine facial features of a user. The instructions further cause the processor to compute an emotional quotient of the user based on the facial features, determine a trigger to re-compute the sampling frequency the feed, based in part on the emotional quotient and compute a new sampling frequency based in part on the trigger. Thereafter, the instructions further cause the processor to generate instructions for the sensor to capture the feed at the new sampling frequency.

In an aspect of the invention, the method, of adaptive sampling for determining the emotional state of a user, comprises receiving a feed from a sensor at a default sampling frequency, and analyzing the feed to determine facial features of a user. The method further comprises computing an emotional quotient of the user based on the facial features, determining a trigger to re-compute the sampling frequency the feed, based in part on the emotional quotient and computing a new sampling frequency based in part on the trigger. Thereafter, the method comprises generating instructions for the sensor to capture the feed at the new sampling frequency.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
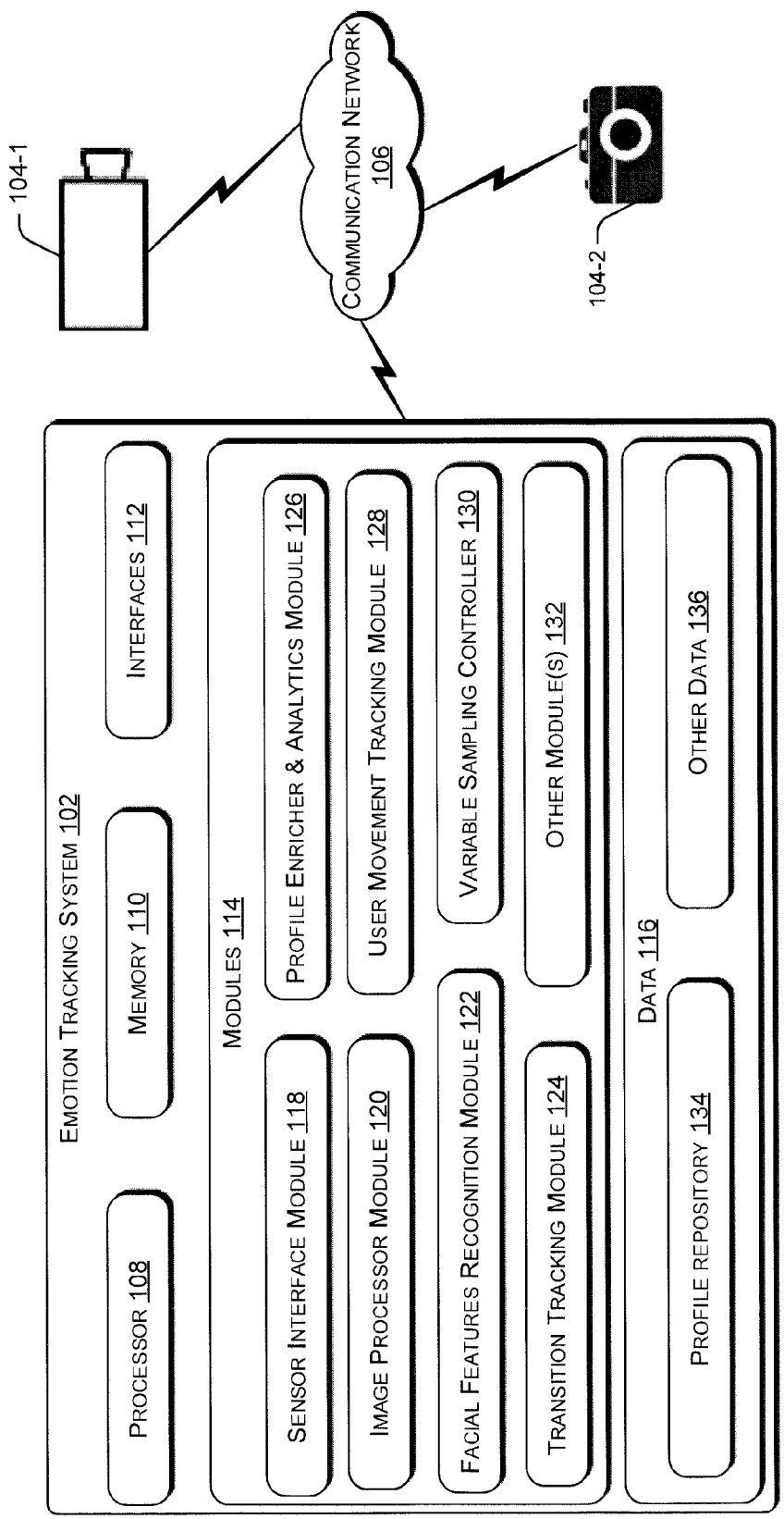
FIG. 1 illustrates a network environment implementing an emotion tracking system for determining the emotional state of a user, according to some embodiments of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Systems and methods of adaptive sampling for determining the emotional state of a user are described herein. The systems and methods may be implemented in a variety of computing systems. The computing systems that can implement the described method(s) include, but are not limited to a server, a desktop personal computer, a notebook or a portable computer, a mainframe computer, and in a mobile computing environment. Although the description herein is with reference to certain computing systems, the systems and methods may be implemented in other computing systems, albeit with a few variations, as will be understood by a person skilled in the art.

Most of the commercially available techniques of ascertaining emotions through facial features focus on accurately measuring the facial expressions as well as the location of facial actions, their intensity and their dynamics. For example, the intensity of facial expressions may be measured by determining one or more of the geometric deformation of facial features or the density of wrinkles appearing in certain facial regions. For the purpose of illustration, the degree of a smiling may be indicated by measuring the magnitude of cheek and lip corner raising as well as wrinkle displays. However, since there are inter-personal variations with regard to the amplitudes of facial actions, it is difficult to determine absolute facial expression intensities, without referring to the neutral face of the user. Further, measuring the intensity of spontaneous facial expressions is more difficult in comparison to posed facial expressions as posed facial expressions are usually displayed with an exaggerated intensity and thus, can be more easily measured.

Further, not only the nature of the deformation of facial features conveys meaning, but also the relative timing of facial actions as well as their temporal evolution. Since, static images do not clearly reveal subtle changes in faces, most conventional techniques also focus on measuring the dynamics of facial expressions. However, dynamics of facial features, usually described with the aid of three temporal parameters: onset (attack), apex (sustain), o<set (relaxation), is a very individualistic feature with wide variance from user to user.

Most of the conventional techniques capture images of the user at a predefined sampling frequency so as to determine changes in the facial expressions of the user. However, capture images of the user at a predefined sampling frequency has two inherent drawbacks. If the predefined sampling frequency is lower than the rate of change of facial expression of the user, the conventional techniques fail to capture the changes in facial expression of the user and thus generates inaccurate emotional quotient, indicative of the emotional state of the user. If the predefined sampling frequency is more than the rate of change of facial expression of the user, the conventional techniques capture more data, than what is required, for determining the changes in facial expression of the user. This means that more volume of data is to be processed which results in wastage of resources, such as processing power and memory. Thus, the conventional techniques are either resource intensive which reduces their implementation across various devices, such as tablets, laptops, mobile phones and smart phones, or are inaccurate which reduces their implementation for most practical applications.

The present subject matter discloses systems and methods of adaptive sampling for determining the emotional state of a user. In one implementation, an emotion tracking system is communicatively coupled to a sensor to capture the image of a user at a default frequency rate. The sensor may be understood to be any image capturing device, such as a digital camera and a video camera, which captures the images of the user at a default sampling frequency. The sensor may be communicatively coupled to the emotion tracking system either directly or over a network.

In operation, the emotion tracking system receives a feed, from the sensor, which comprises images of the user captured at the default sampling frequency. The emotion tracking system analyzes the feed to detect the face of the user in the feed. The emotion tracking system may use various commercially available facial recognition techniques, such as principal component analysis using eigen-faces, linear discriminate analysis, elastic bunch graph matching using the fisherface algorithm, the hidden markov model, the multi-linear subspace learning using tensor representation, and the neuronal motivated dynamic link matching. The emotion tracking system further analyzes the detected face to ascertain the facial features of the user. Examples of facial features may include tongue show, jaw thrust, jaw sideways, lip bite, cheek blow, cheek puff, cheek suck, tongue bulge, lip wipe, dimple, lip corner depression and so on. Each of these facial features may be associated with a pre-defined emotion indicator. Based on the mapping of the determined facial features with the pre-defined emotion indicators, the emotion tracking system computes an emotional quotient of the user.

In one example, the emotion tracking system includes modules for user movement (UM), user emotional transition (UET), and content characterization (CC). Based on one or more of UM, UET or CC, the emotional state of the user may undergo changes at a rate which varies from user to user and is a very individualistic feature of every human being. The modules for UM, UET or CC determine the instant when a trigger is to be generated for re-computing the sampling frequency.

In operation, the emotion tracking system determines whether a trigger for re-computing the sampling frequency has been activated. On determining the trigger to have been activated, the emotion tracking system determines the case of the trigger which is at least one of user movement (UM), user emotional transition (UET), and content characterization (CC). Based on the determination of the cause of trigger, the emotion tracking system computes a new sampling frequency based on the determination and generates instructions for the sensor to capture the images of the user at the new sampling frequency. For example, the emotion tracking system increases the sampling frequency if the rate of emotional transition is high.

Thereafter, the emotion tracking system starts receiving the feed at the new sampling frequency. In one example, the emotion tracking system may check for the activation of the trigger at regular time intervals. In another example, the emotion tracking system may check for the activation of the trigger at a frequency which is based on the frequency at which the emotions of the user are changing and so on.

Figure 2:
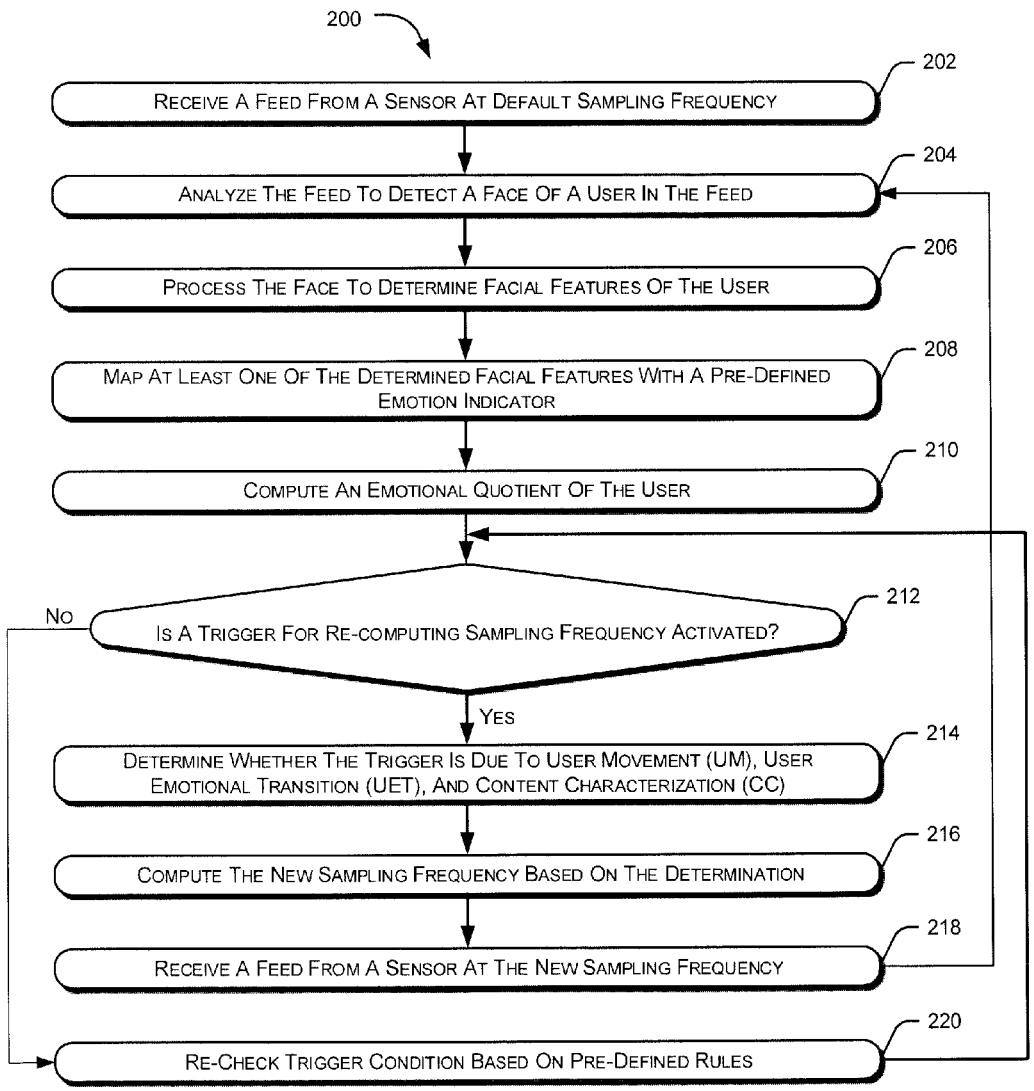
FIG. 2 illustrates an exemplary computer implemented method for determining the emotional state of a user, according to an embodiment of the present subject matter.
Figure 3:
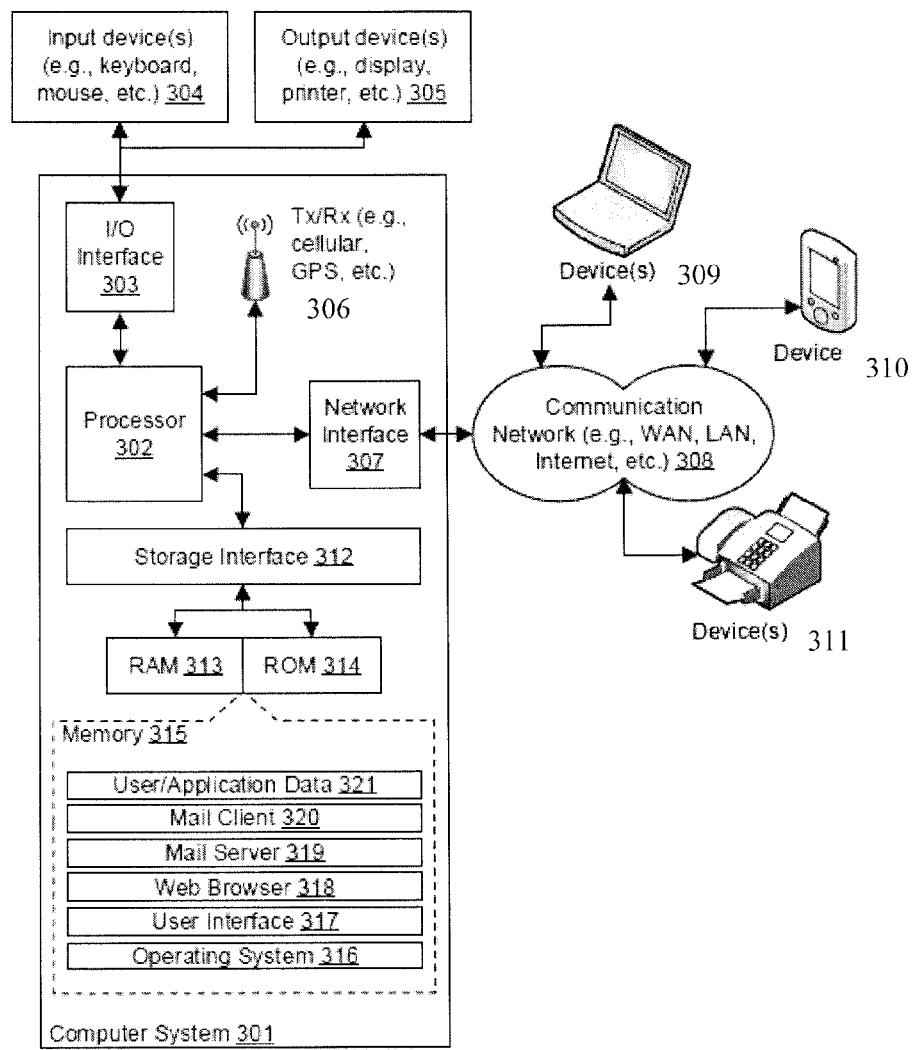
FIG. 3 is a block diagram of an exemplary computer system for implementing embodiments consistent with the present disclosure.

The working of the systems and methods for determining the emotional state of a user is described in greater detail in conjunction with FIG. 1-3. It should be note that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates an exemplary network environment 100 implementing an emotion tracking system 102 for determining the emotional state of a user, according to some embodiments of the present subject matter.

The emotion tracking system 102 may be implemented in a variety of computing systems, such as a laptop computer, a desktop computer, a notebook, a workstation, a server, a network server, and the like. In one example, the emotion tracking system 102 may be communicatively coupled to sensors 104-1 and 104-2. The sensors 104 may be understood to be any image capturing device, such as a digital camera and a video camera, which captures the images of the user at a default sampling frequency. In one example, the sensor 104 may be directly communicatively coupled to the emotion tracking system 102. In another example, as shown in the figure, the sensors 104 may be communicatively coupled to the emotion tracking system 102 through a network 106 for facilitating the capturing of images of the user. In one example, the sensor 104 may be integrated within the emotion tracking system 104, for example as an in-built camera.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc.

In one implementation, the emotion tracking system 102 includes a processor 108, a memory 110 coupled to the processor 108 and interfaces 112. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 110. The memory 110 can include any non-transitory computer-readable medium known in the art including, for example, volatile memory (e.g., RAM), and/or non-volatile memory (e.g., EPROM, flash memory, etc.).

The interface(s) 112 may include a variety of software and hardware interfaces, for example, a web interface, a graphical user interface, etc., allowing the emotion tracking system 102 to interact with the client devices 104. Further, the interface(s) 112 may enable the emotion tracking system 102 respectively to communicate with other computing devices, The interface(s) 112 can facilitate multiple communications within a wide variety of networks and protocol types, including wired networks, for example LAN, cable, etc., and wireless networks such as WLAN, cellular, or satellite. The interface(s) 112 may include one or more ports for connecting a number of devices to each other or to another server.

In one example, the emotion tracking system 102 includes modules 114 and data 116. In one embodiment, the modules 114 and the data 116 may be stored within the memory 110. In one example, the modules 114, amongst other things, include routines, programs, objects, components, and data structures, which perform particular tasks or implement particular abstract data types. The modules 114 and may also be implemented as, signal processor(s), state machine(s), logic circuitries, and/or any other device or component that manipulate signals based on operational instructions. Further, the modules 114 can be implemented by one or more hardware components, by computer-readable instructions executed by a processing unit, or by a combination thereof.

In one implementation, the modules 114 further include a sensor interface module 118, an image processor module 120, a facial features recognition module 122, a transition tracking module 124, a profile enricher & analytics (PEA) module 126, an user movement tracking module 128, a variable sampling controller 130, and other module(s) 132. The other modules 132 may perform various miscellaneous functionalities of the emotion tracking system 102. It will be appreciated that such aforementioned modules may be represented as a single module or a combination of different modules.

In one example, the data 116 serves, amongst other things, as a repository for storing data fetched, processed, received and generated by one or more of the modules 114. In one implementation, the data 116 may include, for example, a profile repository 134, and other data 136. In one embodiment, the data 116 may be stored in the memory 110 in the form of various data structures. Additionally, the aforementioned data can be organized using data models, such as relational or hierarchical data models. The other data 136 may be used to store data, including temporary data and temporary files, generated by the modules 114 for performing the various functions of the emotion tracking system 102.

In one implementation, the sensor interface module 118 receives the feed from the sensors at the default sampling frequency. As mentioned earlier, the sensor interface module 118 may receive the feed from the sensors 104 over the communication network 106 or over various other interfaces, such as universal serial bus (USB) and High-Definition Multimedia Interface (HDMI). On receiving the feed from the sensors, the sensor interface module 118 forwards the feed to the image processing module 120. The image processing module 120 processes the feed and detects one or more faces on the feed. In one example, the image processing module 120 may detect faces in the feed using various commercially available facial recognition techniques, such as principal component analysis using eigen-faces, linear discriminate analysis, elastic bunch graph matching using the fisherface algorithm, the hidden markov model, the multi-linear subspace learning using tensor representation, and the neuronal motivated dynamic link matching.

Thereafter, the facial features recognition module 122 identifies facial features from the detected faces. For the ease of explanation, the further working of the emotion tracking system 102 is explained with reference to a single face on the feed. The same techniques can be applied, ambit minor variations, in case there are multiple faces in the feed. In one example, the facial features recognition module 122 identifies facial features based on the relative position, size, and/or shape of the eyes, nose, cheekbones, and jaw. In other examples, the facial features recognition module 122 may use any commercially available image processing technique to identify the facial features from the detected face. In one example, the facial features recognition module 122 may detect the presence or absence of facial features that re recognized as action units (AU) in accordance with the Facial Action Coding System (FACS), which is a system to taxonomize human facial movements by their appearance on the face. Table 1, below, shows an exemplary list of facial features, along with their AU number and FACS name, the presence or absence of which may be detected by the facial features recognition module 122.

TABLE 1

| AU Number | FACS Name |
|---|---|
| 0 | Face |
| 19 | Tongue Show |
| 29 | Jaw Thrust |
| 30 | Jaw Sideways |
| 32 | [Lip] Bite |
| 33 | [Cheek] Blow |
| 34 | [Cheek] Puff |
| 35 | [Cheek] Suck |
| 36 | [Tongue] Bulge |
| 37 | Lip Wipe |
| 14 | Dimpler |
| 15 | Lip Corner Depressor |
| 4 | Brow Lowerer |
| 16 | Lower Lip Depressor |
| 25 | Lips Part |
| 2 | Outer Brow Raiser |
| 1 | Inner Brow Raiser |
| 18 | Lip Pucker |
| 13 | Sharp Lip Puller |
| 9 | Nose Wrinkler |
| 10 | Upper Lip Raiser |
| 5 | Upper Lid Raiser |
| 31 | Jaw Clencher |
| 26 | Jaw Drop |

TABLE 1-continued

| AU Number | FACS Name |
| --- | --- |
| 17 | Chin Raiser |
| 38 | Nostril Dilator |
| 39 | Nostril Compressor |
| 46 | Wink |
| 6 | Cheek Raiser |
| 7 | Lid Tightener |
| 8 | Lips Toward Each Other |
| 22 | Lip Funneler |
| 23 | Lip Tightener |
| 24 | Lip Pressor |
| 28 | Lip Suck |
| 21 | Neck Tightener |
| 27 | Mouth Stretch |
| 43 | Eyes Closed |
| 45 | Blink |
| 20 | Lip Stretcher |
| 44 | Eyebrow Gatherer |
| 41 | Glabella Lowerer |
| 42 | Inner Eyebrow Lowerer |
| 12 | Lip Corner Puller |
| 11 | Nasolabial Deepener |

In one example, the facial features recognition module 122 maps the detected facial features with the AUs of the FACS and assigns the AU number to the detected facial feature. Based on the combination of the AU numbers present in the detected face, the PEA module 126 determines the emotional state of the user. In one example, the PEA module 126 implements the FACS to determine the emotional state of the user based on the AU numbers present in the detected face of the user. Table 2, below, shows an exemplary mapping between the emotional state of the user and the facial features (indicated by their AU numbers) present on the face of the user. In the column of "AU numbers present in face", the alphabets represent the intensity of the facial feature, wherein 'A' is the minimum and 'E' is the maximum.

TABLE 2

| Emotional state | AU numbers present in face |
| --- | --- |
| Happiness | 6 + 12 |
| Sadness | 1 + 4 + 15 |
| Surprise | 1 + 2 + 5B + 26 |
| Fear | 1 + 2 + 4 + 5 + 20 + 26 |
| Anger | 4 + 5 + 7 + 23 |
| Disgust | 9 + 15 + 16 |
| Contempt | 12A + 14A |

On determining the emotional state of the user, the PEA module 126, generates a profile of the user and stores the same in the profile repository 134. In a parallel of sequential operation, the variable sampling controller 130 determines whether a trigger for re-computing sampling frequency is activated. In one example, the trigger may be generated by the transition tracking module 124 and/or the user movement tracking module 128. Herein, it should be noted that different users may have different frequency of movement of the facial features due to the inherent nature of the users. Also, different users may have different time for transition of intensity of facial expressions. Further, even a specific user may have different rate of emotional transitions (slow/fast) based on the scenario of the user, such as the content being viewed by the user and the music the user is listening to, The trigger for re-computing sampling frequency may be activated due to user movement (UM), user emotional transition (UET), and content characterization (CC). In one example, for content characterization (CC), the variable sampling controller 130 receives the movement characteristics and the emotional transition characteristics from the user movement tracking module 128 and the transition tracking module 124 respectively with associated content type. Usually, an individual's expression of an emotion is unique in terms of the movements of the face and/or the deviation of various features of the face like cheeks, mouth, eye in relation to a neutral expression. This expression of expression is referred to as movement characteristics. If at least one of the movement characteristics or the emotional transition characteristics exceeds a pre-defined threshold, then the variable sampling controller 130 receives the trigger from the user movement tracking module 128 and the transition tracking module 124 respectively.

In another example, user movement (UM), the variable sampling controller 130 tracks the number of frame drops while computing movement characterization. In movement characterization, the extent of movement being exerted for an emotional display is computed. In one example, the movement characterization is computed by analyzing the differences between the various facial features between previous frame and current frame in relation to time. For example, if an user is going to be moving drastically the sampling frequency may be increased (i.e., say from 2 seconds to 5 seconds) as the chances of obtaining a clear facial picture for feature extraction and emotion detection is nil or minimal; This along with the emotional transition characteristics shall be used to compute a sampling frequency as close as possible to real time detection without loss of information and at the same time not using the system continuously;

For example, frames may be discarded if the image processor module 120 determines the captured image is blurred, as per pre-defined image processing parameters, to the extent that it is not fir for processing. The variable sampling controller 130 keeps a track of the rate at which the images are discarded and on determining the number of frame drops to have exceeded a pre-defined threshold, the variable sampling controller 130 re-computes the sampling frequency.

In the case of emotional transition characteristics, the transition tracking module 124 identifies the emotional state of the user in the initial image and then compare the emotional state computed with subsequent images that are processed by facial features recognition module 122. If the facial features recognition module detects a change in emotional state between the initial image and any one of the subsequent images, then emotional transition is identified. In one example, the facial features recognition module 122 also detects change in intensity of the facial expressions between the initial image and any one of the subsequent images. If the rate of change of emotional state or rate of change of intensity of the facial expressions between the initial image and any one of the subsequent images exceeds a pre-defined threshold, then the variable sampling controller 130 is sent a trigger and based on the trigger, the variable sampling controller 130 re-computes the sampling frequency. Thereafter, the variable sampling controller 130 generates instructions for the sensor to capture the images ate the recomputed sampling frequency.

In one example, the PEA module 126 updates the profile of the user with the re-computed sampling frequency. In one example, thereafter, in future, the said user is captured at the re-computed sampling frequency instead of at the default sampling frequency.

In an exemplary method of characterization of user movement, the PEA module 126 analyzes the type of content with the user and updates the profile of the user accordingly. For example, the PEA module 126 may determine the emotional state of the user while watching various genres of content, such as action, adventure, comedy, crime, fantasy, historical, horror, mystery, paranoid, philosophical, political, realistic, romance, saga and satire. Based on the association of the type of content and the emotional state of the user, the PEA module 126 updates the profile of the user. Based on the updated profile of the user, the emotion tracking system 102 may suggest content type to the user based on his current emotional state.

Thus, the emotion tracking system 102 implements an optimized emotion tracking technique which reduces the requirements of processing power and memory without compromising the accuracy of the determination of emotional state of the user. Further, the emotion tracking system 102 associates a personalized sampling frequency with every user which accounts for variation in emotions and change of emotions from person to person. The detailed working of the emotion tracking system 102 is further explained in conjunction with the FIGS. 2-3.

FIG. 2 illustrates an exemplary computer implemented method 200 for determining the emotional state of a user, according to an embodiment of the present subject matter. The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to method 200 as depicted in FIG. 2, as shown in block 202, a feed, at a default sampling frequency, is received from a sensor. In one example, the sensor interface module 118 receives the feed from the sensors 104 at the default sampling frequency. In various examples, the sensor interface module 118 may receive the feed from the sensors 104 over the communication network 106 or over various other interfaces, such as USB and HDMI.

As illustrated in block 204, the feed is analyzed to detect a face of a user in the feed. In one example, the image processing module 120 processes the feed and detects one or more faces on the feed. In one example, the image processing module 120 may detect faces in the feed using various commercially available facial recognition techniques, such as principal component analysis using eigen-faces, linear discriminate analysis, elastic bunch graph matching using the fisherface algorithm, the hidden markov model, the multilinear subspace learning using tensor representation, and the neuronal motivated dynamic link matching.

As depicted in block 206, the face is processed to determine facial features of the user. In one example, the facial features recognition module 122 identifies facial features from the detected faces. In one example, the facial features recognition module 122 identifies facial features based on the relative position, size, and/or shape of the eyes, nose, cheekbones, and jaw. In other examples, the facial features recognition module 122 may use any commercially available image processing technique to identify the facial features from the detected face. In one example, the facial features recognition module 122 may detect the presence or absence of facial features that re recognized as AUs in accordance with the FACS.

At block 208, at least one of the determined facial features is mapped with a pre-defined emotion indicator. In one example, the facial features recognition module 122 maps the detected facial features with the AUs of the FACS and assigns the AU number to the detected facial feature.

As shown in block 210, an emotional quotient of the user is computed. In one example, based on the combination of the AU numbers present in the detected face, the PEA module 126 determines the emotional state of the user and computes an emotional quotient indicative of the emotional state of the user. In one example, the PEA module 126 implements the FACS to determine the emotional state of the user based on the AU numbers present in the detected face of the user.

At block 212 it is determined whether a trigger for re-computing sampling frequency is activated. In one example, the variable sampling controller 130 determines whether a trigger for re-computing sampling frequency is activated. In one example, the trigger may be generated by the transition tracking module 124 and/or the user movement tracking module 128.

If at block 212, it is determined that the trigger for re-computing sampling frequency is activated, then as shown in block 214, it is determined whether the trigger is due to user movement (UM), user emotional transition (UET), and content characterization (CC). In one example, the variable sampling controller 130 determines whether the trigger is due to user movement (UM), user emotional transition (UET), and content characterization (CC).

As illustrated in block 216, the new sampling frequency is computed based on the determination. In one example, the variable sampling controller 130 computes the new sampling frequency based on the determination. Since this has been already described in conjunction FIG. 1, the same is not repeated here for sake of brevity.

As depicted in block 218, a feed is received from the sensor at the new sampling frequency. In one example, the variable sampling controller 130 instructs the sensor to capture the images at the new sampling frequency. In said example, the sensor interface module 118 receives the feed from the sensors 104 at the new sampling frequency.

If at block 212, it is determined that the trigger for re-computing sampling frequency is not activated, then as shown in block 220, trigger condition is re-checked based on pre-defined rules. In one example, the variable sampling controller 130 rechecks the trigger condition based on pre-defined rules, such as regular time intervals, and so on.

Computer System

FIG. 3 is a block diagram of an exemplary computer system for implementing embodiments consistent with the present disclosure. Variations of computer system 301 may be used for implementing any of the devices presented in this disclosure. Computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 318-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol); secure sockets layer (SSL), Transport Layer Security (TLS), etc. Web browsers may utilize facilities such as AJAX, DHTML, Adobe Flash, JavaScript, Java; application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and a system for determining the emotional state of a user. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An emotion tracking computing device, comprising:
  a processor; and
  a memory communicatively coupled to the processor, wherein the memory stores processor-executable instructions that comprise and, when executed by the processor, cause the processor to:
    receive a feed from a sensor at a default sampling frequency;
    analyze the feed to determine facial features of a user;
    determine a cause of a trigger to re-compute the default sampling frequency for the feed, wherein the cause is based on user movement, user emotional transition, and content characterization;
    compute a new sampling frequency based at least in part on the cause; and
    generate one or more instructions for the sensor to capture the feed at the new sampling frequency.

2. The emotion tracking computing device as claimed in claim 1, wherein the processor-executable instructions further comprise and, when executed by the processor, further cause the processor to:
  compute an emotional quotient of the user based on the facial features.

3. The emotion tracking computing device as claimed in claim 1, wherein the processor-executable instructions further comprise and, when executed by the processor, further cause the processor to:
  map at least one of the facial features of the user with a list of pre-defined emotion indicators, wherein each of the pre-defined emotion indicators is associated with a weight; and
  compute the emotional quotient based at least in part on the mapping.

4. The emotion tracking computing device as claimed in claim 1, wherein the processor-executable instructions further comprise and, when executed by the processor, further cause the processor to at least one of:
  enhance the default sampling frequency upon determining at least one of user movement or user emotional transition, or
  decrease the default sampling frequency upon determining lack of at least one of user movement or user emotional transition.

5. The emotion tracking computing device as claimed in claim 1, wherein the processor-executable instructions further comprise and, when executed by the processor, further cause the processor to:
  associate the user emotional transition with a content being experienced by the user; and
  update a profile of the user based on the association.

6. The emotion tracking computing device as claimed in claim 5, wherein the processor-executable instructions further comprise and, when executed by the processor, further cause the processor to compute the new sampling frequency based in part on the updated profile of the user.

7. A method for determining the emotional state of a user, the method comprising:
  receiving, by an emotion tracking computing device, a feed from a sensor at a default sampling frequency;
  analyzing, by the emotion tracking computing device, the feed to determine facial features of a user;
  determining, by the emotion tracking computing device, a cause of a trigger to re-compute the default sampling frequency for the feed, wherein the cause is based on user movement, user emotional transition, and content characterization;
  computing, by the emotion tracking computing device, a new sampling frequency based at least in part on the cause; and
  generating, with the emotion tracking computing device, instructions for the sensor to capture the feed at the new sampling frequency.

8. The method as claimed in claim 7, wherein the method further comprises:

computing, by the emotion tracking computing device, an emotional quotient of the user based on the facial features.

9. The method as claimed in claim 7, wherein the method further comprises:
  mapping, by the emotion tracking computing device, at least one of the facial features of the user with a list of pre-defined emotion indicators, wherein each of the pre-defined emotion indicators is associated with a weight; and
  computing, by the emotion tracking computing device, the emotional quotient based at least in part on the mapping.

10. The method as claimed in claim 7, wherein the computing the new sampling frequency further comprises at least one of:
  enhancing the default sampling frequency upon determining at least one of user movement or user emotional transition, or
  decreasing the default sampling frequency upon determining lack of at least one of user movement or user emotional transition.

11. The method as claimed in claim 7, wherein the method further comprises:
  associating, by the emotion tracking computing device, the user emotional transition with a content being experienced by the user; and
  updating, by the emotion tracking computing device, a profile of the user based on the association.

12. The method as claimed in claim 11, further comprising computing, by the emotion tracking computing device, the new sampling frequency based in part on the updated profile of the user.

13. A non-transitory computer readable medium comprising processor executable instructions, which when executed by a processor cause the processor to perform steps comprising:
  receiving a feed from a sensor at a default sampling frequency;
  analyzing the feed to determine facial features of a user;
  determining a cause of a trigger to re-compute the default sampling frequency for the feed, wherein the cause is based on user movement, user emotional transition, and content characterization;
  computing a new sampling frequency based at least in part on the cause; and
  generating instructions for the sensor to capture the feed at the new sampling frequency.

14. The non-transitory computer readable medium of claim 13, wherein the processor executable instructions, when executed by the processor, further cause the processor to perform steps further comprising:
  computing an emotional quotient of the user based on the facial features.

15. The non-transitory computer readable medium of claim 13, wherein the processor executable instructions, when executed by the processor, further cause the processor to perform steps further comprising:
  mapping at least one of the facial features of the user with a list of pre-defined emotion indicators, wherein each of the pre-defined emotion indicators is associated with a weight; and
  computing the emotional quotient based at least in part on the mapping.

16. The non-transitory computer readable medium of claim 13, wherein the computing the new sampling frequency further comprises at least one of:
  enhancing the default sampling frequency upon determining at least one of user movement or user emotional transition, or
  decreasing the default sampling frequency upon determining lack of at least one of user movement or user emotional transition.

17. The non-transitory computer readable medium of claim 13, wherein the processor executable instructions, when executed by the processor, further cause the processor to perform steps further comprising:
  associating the user emotional transition with a content being experienced by the user; and
  updating a profile of the user based on the association.

18. The non-transitory computer readable medium of claim 13, wherein the processor executable instructions, when executed by the processor, further cause the processor to perform steps further comprising computing the new sampling frequency based in part on the updated profile of the user.

* * * * *